United States Patent Office 3,346,590
Patented Oct. 10, 1967

3,346,590
SULFONYL ISOTHIOCYANATES AND A PROCESS FOR THEIR PRODUCTION
Karlfried Dickoré, Leverkusen, and Engelbert Kühle, Cologne-Stammheim, Germany, assignors to Farbenfabriken Bayer Aktiengesellschaft, Leverkusen, Germany, a German corporation
No Drawing. Filed May 18, 1964, Ser. No. 368,418
Claims priority, application Germany, Jan. 21, 1964, F 39,854
20 Claims. (Cl. 260—327)

The invention relates to sulfonyl isothiocyanates of the general formula

R—SO₂—NCS wherein R stands for an alkyl radical, a cycloalkyl radical, an aromatic radical, which may be substituted if desired, or a heterocyclic radical. Furthermore this invention relates to a process for the production thereof.

It has been found that sulfonyl isothiocyanates of the general formula as indicated above can be obtained by reacting sulfonyl iminodithiocarbonates with acid halides. As acid halides for the reaction according to the invention it is, for example, possible to employ: phosgene, thiophosgene, oxalyl chloride, sulphur dichloride, disulphur dichloride, thionyl chloride, sulphuryl chloride, phosphorus trichloride, phosphorus oxychloride and phosphorus pentachloride, phosphorus pentabromide, carbonic acid dibromide, ester chlorides of carbonic acid, e.g., carbonic methylester chloride, carbonic butylesterchloride, carbonic phenylester chloride etc.

The sulfonyl iminodithiocarbonates used as starting compounds can be prepared from sulphonamides and carbon disulphide in the presence of strong bases. It is, for example, possible to use the following sulfonyl iminodithiocarbonates:

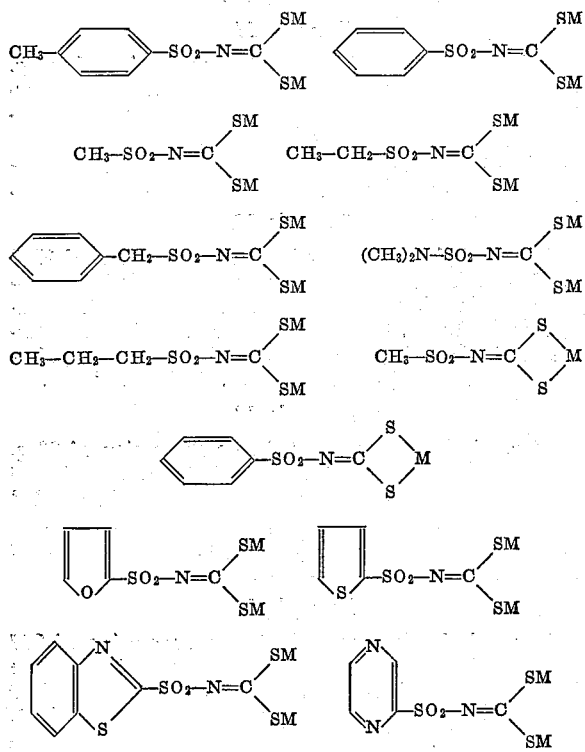

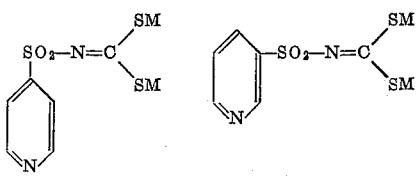

wherein M represents a monovalent or a polyvalent metal. Alkali metals, alkaline-earth metals or heavy metals as lead can for example be considered as metals.

In order to illustrate the process, an equation for the reaction of potassium p-toluosulfonyl iminodithiocarbonate with phosgene is now given:

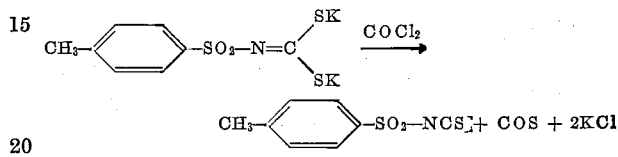

The process according to the invention can be carried out in inert organic solvents, for example, hydrocarbons such as: toluene, xylene, benzene and cyclohexane, or chlorinated hydrocarbons, e.g., chlorobenzene, trichlorobenzene, methylene chloride and carbon tetrachloride and at temperatures of about −10° C. to +120° C., advantageously +0 to +50° C., being used. The solution can be worked up by filtering off the metal halide formed in the reaction, subsequently evaporating the solvent and purifying the sulfonyl isothiocyanate by distillation.

For the process according to the invention, sulfonyl iminodithiocarbonates and acid chlorides are used in the molar ratio of about 1:1 to about 1:3.

It is to be considered as extremely surprising that sulfonyl iminodithiocarbonates react in the manner indicated. It is of course known that the salts of dithiocarbamic acid obtainable from amines, carbon disulphide and bases can change on phosgenation into isothiocyanates (Houben-Weyl "Methoden der organischen Chemie" 4th edition (1955), vol. IX, page 871).

The sulfonyl iminodithiocarbonates used as starting materials in the process according to the invention are, on the contrary, prepared from sulfonamides and carbon disulphide. Since the acid sulfonamides have no similarities with the basic amines as regards their chemical properties, the reaction according to the invention was not to be foreseen.

The new sulfonyl isothiocyanates are intermediate products for the preparation of pharmaceutical compounds and dyestuffs. Blood sugar depressing agents such as sulfonyl ureas may be prepared from the new sulfonylisothiocyanates according to the following equation:

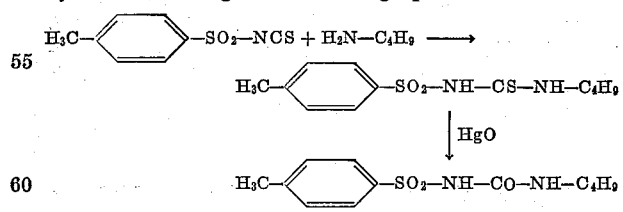

Furthermore these compounds are excellent acylation components.

Example 1

400 g. of phosgene are introduced into a suspension of 645 g. (2 moles) of potassium p-toluenesulfonyl-iminodithiocarbonate in 2 litres of chlorobenzene while stirring at 0 to 10° C. (cooling with ice). Stirring is continued for 2 hours at room temperature, the precipitated potassium chloride (278 g.) is filtered off with suction and the filtrate is concentrated in water jet vacuum with a bath temperature of 100° C. The residue (390 g.) is distilled under high vacuum (yield: 366 g. of p-toluenesulfonylisothiocyanate (86% of the theoretical). B.P.$_{0.65}$ 115–125° C. (free from schlieren, somewhat overheated) M.P.: +4° C.; $n_D^{20}$=1.5938. Redistilled: B.P.$_{0.6}$ 107–109° C., refractive index unchanged.

Analysis.—$C_8H_7NO_2S_2$ (213)—Calculated: C, 45.0; H, 3.28; N, 6.56; S, 30.0. Found: C, 45.0; H, 3.44; N, 6.48; S, 30.0.

Example 2

A solution of 22 ml. of thionyl chloride in 250 ml. of chlorobenzene is added dropwise to a suspension of 48.5 g. (0.15 mole) of potassium p-toluenesulfonyl iminodithiocarbonate in 250 ml. of chlorobenzene while stirring at 0 to 10° C. Stirring is continued for one hour at 25 to 35° C., the potassium chloride (23 g.), is filtered off with suction and the filtrate is concentrated in vacuo.

The precipitated plastic sulfur (8 g.) is removed and the residue is distilled. Yield: 18 g. of p-toluenesulfonyl-isothiocyanate, identical with the product prepared according to Example 1.

Example 3

500 g. of phosgene are added to a suspension of 773 g. (2.5 moles) of potassium benzene-sulfonyl iminodithiocarbonate in 1.5 litres of benzene at 5 to 10° C. while stirring. After working up in the same way as indicated in Example 1, 450 g. (91% of the theoretical) of benzene-sulfonyl-isothiocyanate are obtained. B.P.$_{0.3}$ 100–102° C., M.P.−19° C.; $n_D^{20}$=1.6012.

Example 4

22 g. of phosgene are introduced into a suspension of 49.4 g. (0.2 mole) of potassium methane-sulfonyl iminodithiocarbonate in 500 ml. of benzene while stirring and cooling with ice. After working up in the same way as indicated in Example 1, 23 g. of methane-sulfonyl-isothiocyanate (82% of the theoretical) are obtained. B.P.$_{18}$ 104–106° C., M.P. −24° C.; $n_D^{20}$=1.5449. In an analogous manner there are obtained: from potassium butane-sulfonyl-iminodithiocarbonate and phosgene butane-sulfonyl-isothiocyanate, B.P.$_{0.2}$ 72–75° C., M.P. <−60° C., $n_D^{20}$=1.5171; from potassium cyclohexane-sulfonyl-iminodithio-carbonate and phosgene cyclohexane-sulfonyl-isothiocyanate, B.P.$_{0.2-0.4}$ 92–97° C., M.P. 0° C., $n_D^{20}$=1.5489; from potassium dodecane-sulfonyl-iminodithiocarbonate and phosgene dodecane-sulfonyl-isothiocyanate, B.P.$_{0.1-0.2}$ 146–158° C., M.P. ∼−10° C., $n_D^{20}$=1.4831.

Example 5

81 g. of potassium p-toluenesulphonyl-iminodithiocarbonate are introduced in portions into a solution of 52 g. of phosphorus pentachloride in 500 ml. of carbon tetrachloride at 55–60° C. and, after the exothermic main reaction has subsided, the reaction mixture is boiled under reflux for another 20 minutes. The precipitated potassium chloride (39 g.) is filtered off with suction, the solvent is extracted at normal pressure and the residue is distilled under oil pump vacuum, 47 g. of p-toluenesulphonyl-isothiocyanate are obtained. B.P.$_{0.6}$ 107–109° C.

Example 6

200 g. of carbonic methylesterchloride are added to a suspension of 323 g. of potassium toluene sulfonyl iminodithiocarbonate in 1 litre of toluene at a temperature of 23° C. The temperature rises to 43° C. while stirring 6 hours without heating. The potassium chloride is filtered off and the filtrate is concentrated in vacuo. The residue is distilled under high vacuum. Yield: 111 g. of p-toluene sulfonyl-isothiocyanate (B.P. 107–109° C.) and 108 g. of sulfodicarbonic dimethylester (B.P.$_{0.6}$ 60.5° C.).

Example 7

78 g. of phosgene are introduced in a suspension of 128 g. lead benzene-1,3-disulfonyl-iminodithiocarbonate in 480 ml. of carbontetrachloride at a temperature of between 25 to 30° C. Further procedure is carried out according to Example 1. Yield: 14 g. of benzene-1,3-disulfonyl-isothiocyanate (B.P.$_{0.008}$ 161° C., $n_D^{20}$=1.6456).

Example 8

630 g. of phosgene are added to a suspension of 1785 g. of potassium o-toluenesulfonyl-iminodithiocarbonate in 4 litres of carbontetrachloride at a temperature below 20° C. Further procedure according to Example 1. Yield: 1022 g. of o-toluene sulfonyl-isothiocyanate (B.P.$_{0.15}$ 114° C., M.P.: 17° C., $n_D^{20}$=1.6010).

Example 9

200 g. of phosgene are added to a suspension of 42 g. of potassium o-chlorobenzene-sulfonyl-iminodithiocarbonate in 2 litres of carbontetrachloride at a temperature of 20 to 30° C. Further procedure according to Example 1. Yield: 320 g. of 2-chlorobenzene-sulfonyl-isothiocyanate (B.P.$_{0.4}$ 127° C., M.P. +4° C., $n_D^{20}$=1.6168).

Example 10

500 g. of phosgene are added to a suspension of 854 g. of potassium m-chlorobenzene-sulfonyl-iminodithiocarbonate in 1.7 litres of carbontetrachloride at a temperature of 10 to 20° C. The precipitated potassium chloride is filtered off with suction and the filtrate is concentrated in vacuo. The residue consists of a crystallinic dimeric sulfonyl-isothiocyanate of the formula:

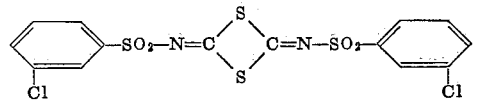

melting about 109° C. under dissociation. Yield: 380 g. After heating to 120° C., the monomeric 3-chlorobenzene-sulfonyl-isothiocyanate boils completely at 90° C./0.01 torr, M.P. 15° C., $n_D^{20}$=1.6132.

Example 11

376 g. of phosgene are added to a suspension of 856 g. of potassium p-chlorobenzene-sulfonyl-iminodithiocarbonate in 1.5 litres of carbontetrachloride at a temperature of +5° C. Further procedure according to Example 1. Yield: 405 g. of 4-chlorobenzene-sulfonyl-isothiocyanate (B.P.$_{0.003}$ 96° C.; M.P. −70° C., $n_D^{20}$=1.6175).

Example 12

390 g. of phosgene are added to a suspension of 1233 g. of potassium 3,4-dichlorobenzene-sulfonylimino-dithiocarbonate in 3 litres of carbontetrachloride at a temperature below 20° C. Further procedure according to Example 1. Yield: 624 g. of 3,4-dichlorobenzene-sulfonyl-isothiocyanate (B.P.$_{0.01}$ 102° C.; M.P. +32 to 33° C.).

Example 13

14 g. of phosgene are added to a suspension of 32 g. of potassium thiophene-2-sulfonyl-dithiocarbonate in 0.5 litre of carbontetrachloride at a temperature of 10 to 20° C. Further procedure according to Example 1. Yield: 18 g. of thiophene-2-sulfonyl-isothiocyanate (B.P.$_{0.2}$ 93 to 95° C.; M.P. +5° C.; $n_D^{20}$=1.6139).

Example 14

88 g. of phosgene are added to a suspension of 267 g. of potassium ω-toluenesulfonylimino-dithiocarbonate in 1.2 litre of carbontetrachloride at a temperature of 20 to 30° C. Further procedure according to Example 1. Yield: 113 g. of ω-toluene-sulfonyl-isothiocyanate (B.P.$_{0.5}$ 120° C.; M.P. +36 to 38° C.).

What we claim is:
1. A sulfonyl-isothiocyanate of the formula

R—SO₂—NCS wherein R represents alkyl having 1–12 carbon atoms, cyclohexyl, phenyl, toluyl, benzyl, phenyl lower alkyl, dilower alkylamino, chlorophenyl,

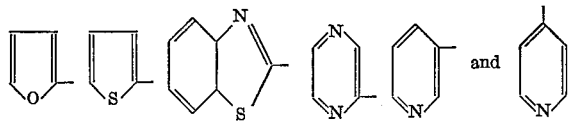

2. p-Tolyl-sulfonyl-isothiocyanate.
3. Methyl-sulfonyl-isothiocyanate.
4. Dodecylsulfonyl-isothiocyanate.
5. Dichloro-phenyl-sulfonyl-isothiocyanate.
6. 2-thiophene-sulfonyl-isothiocyanate.
7. The process as claimed in claim 17, wherein said acid halide is phosgene.
8. The process as claimed in claim 17, wherein said acid halide is phosphorus pentachloride.
9. The process as claimed in claim 17, wherein said sulfonyl iminodithiocarbonate is potassium p-toluene-sulfonyl iminodithiocarbonate.
10. The process as claimed in claim 17, wherein said sulfonyl iminodithiocarbonate is potassium methane sulfonyl iminodithiocarbonate.
11. Benzene-sulfonyl-isothiocyanate.
12. Butyl-sulfonyl-isothiocyanate.
13. Cyclohexyl-sulfonyl-isothiocyanate.
14. Benzene-1,3-disulfonyl-isothiocyanate.
15. Chlorobenzene-sulfonyl-isothiocyanate.
16.

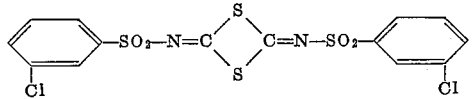

17. A process for the production of sulfonyl-isothiocyanate having the formula

R—SO₂—NCS wherein R represents alkyl having 1–12 carbon atoms, cyclohexyl, phenyl, toluyl, benzyl, phenyl lower alkyl, dilower alkylamino, chlorophenyl,

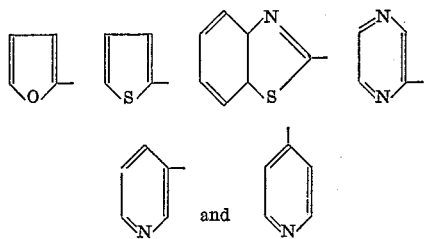

which comprises reacting a sulfonyl-iminodithio carbonate selected from the group consisting of

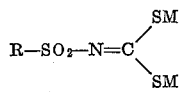

and

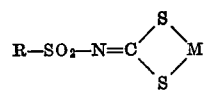

wherein R is as above defined with an acid halide selected from the group consisting of phosgene, thiophosgene, oxalyl chloride, sulfur dichloride, disulfurdichloride, thionyl chloride, sulfuryl chloride, phosphorous trichloride, phosphorous oxychloride, phosphorous pentachloride, phosphorous pentabromide, carbonic acid dibromide, carbonic methyl-ester chloride, carbonic butyl ester chloride, and carbonic phenyl ester chloride at a temperature of from −10° C. to 120° C., utilizing said sulfonylimino dithiocarbonate and acid halide in a molar ratio of between 1:1 to 1:3.

18. Process according to claim 17 wherein said reaction is effected in the presence of an inert solvent.
19. Process according to claim 18 wherein said inert solvent is a member selected from the group consisting of toluene, xylene, benzene, cyclohexane, chlorobenzene, trichlorobenzene, methylene chloride and carbon tetrachloride.
20. The process as claimed in claim 17, wherein said acid halide is thiophosgene.

References Cited

UNITED STATES PATENTS

| | | | |
|---|---|---|---|
| 2,666,787 | 1/1954 | Krzikalla | 260—553 X |
| 2,953,578 | 9/1960 | Haack et al. | 260—553 X |
| 2,990,326 | 6/1961 | Aumuller et al. | 260—553 X |
| 3,185,677 | 5/1965 | Davis | 260—553 X |

FOREIGN PATENTS

| | | |
|---|---|---|
| 578,008 | 6/1959 | Canada. |
| 1,163,802 | 8/1964 | Germany. |
| 898,724 | 6/1962 | Great Britain. |

OTHER REFERENCES

Chemical Abstracts, vol. 41, col. 3440b (1947).
Goerdeler et al.: Tetahedron Letters, pages 3665–3666 (1964).
Gompper et al.: Angew. Chem., vol. 74, page 753 (1962).
Hartke, Arch. Pharm., vol. 299, pages 174 to 178 (1966).
Houben-Weyl, Methoden Der Organischen Chemie, 4th ed., vol 9, page 876, George Thieme Verlag, Stuttgart, Germany (1955).
Kharasch, Organic Sulfur Compounds, vol. 1, page 493, Pergamon Press, London, England (1961).
Leitch et al., Canad. J. Res., vol. 23B, page 142 (1945).
Lowy et al., An Introduction to Organic Chemistry, 6th ed., page 213, John Wiley and Sons (1945).
McKee, et al., J. Am. Chem. Soc., vol. 68, pages 2606–2607 (1946).

JOHN D. RANDOLPH, *Primary Examiner.*

UNITED STATES PATENT OFFICE
CERTIFICATE OF CORRECTION

Patent No. 3,346,590                      October 10, 1967

Karlfried Dickoré et al.

It is hereby certified that error appears in the above numbered patent requiring correction and that the said Letters Patent should read as corrected below.

In the heading to the printed specification, line 9, for "Jan. 21, 1964" read -- May 28, 1963 --; column 2, lines 15 to 20, for that portion of the formula reading "-NCS]" read -- -NCS --; line 27, for "solution" read -- solutions --; column 3, line 64, for "vacuum," read -- vacuum. --; column 4, line 51, for "1.6175" read -- 1.6173 --.

Signed and sealed this 12th day of November 1968.

(SEAL)
Attest:

Edward M. Fletcher, Jr.                          EDWARD J. BRENNER
Attesting Officer                                  Commissioner of Patents